(12) United States Patent
Kaminski et al.

(10) Patent No.: US 10,091,951 B2
(45) Date of Patent: Oct. 9, 2018

(54) PLANTING SYSTEM FOR OPTIMIZATION OF PLANT GROWTH

(71) Applicants: Kristopher Ryan Kaminski, Long Beach, CA (US); Ryan Eric Martinage, Long Beach, CA (US)

(72) Inventors: Kristopher Ryan Kaminski, Long Beach, CA (US); Ryan Eric Martinage, Long Beach, CA (US)

(73) Assignee: Precision Cultivation Systems Holdings, LLC, Long Beach, CA (US)

( * ) Notice: Subject to any disclaimer, the term of this patent is extended or adjusted under 35 U.S.C. 154(b) by 0 days.

(21) Appl. No.: 15/808,629

(22) Filed: Nov. 9, 2017

(65) Prior Publication Data

US 2018/0132431 A1    May 17, 2018

Related U.S. Application Data

(63) Continuation of application No. 15/351,939, filed on Nov. 15, 2016.

(51) Int. Cl.
| | |
|---|---|
| *A01G 9/24* | (2006.01) |
| *A01G 9/02* | (2018.01) |
| *A01G 13/00* | (2006.01) |
| *A01G 27/02* | (2006.01) |

(52) U.S. Cl.
CPC .............. *A01G 9/247* (2013.01); *A01G 9/02* (2013.01); *A01G 13/00* (2013.01); *A01G 27/02* (2013.01)

(58) Field of Classification Search
CPC ........ A01G 9/247; A01G 9/027; A01G 9/047; A01G 13/00; A01G 27/00; A01G 27/005; A01G 27/006; A01G 27/04; A01G 29/00; A01G 9/02; A01G 27/02
See application file for complete search history.

(56) References Cited

U.S. PATENT DOCUMENTS

| | | | | |
|---|---|---|---|---|
| 2,081,337 A | * | 5/1937 | Lockyer ................. | A01G 27/04 47/81 |
| 3,676,953 A | * | 7/1972 | Delogne ................ | A01G 27/04 47/39 |
| 4,265,050 A | * | 5/1981 | Buescher ............... | A01G 27/02 47/71 |
| 5,042,197 A | * | 8/1991 | Pope ........................ | A01G 9/02 47/71 |
| 5,341,596 A | * | 8/1994 | Kao ........................ | A01G 27/04 47/71 |
| 5,644,867 A | * | 7/1997 | Gay ........................ | A01G 9/04 47/65.6 |

(Continued)

*Primary Examiner* — Joshua D Huson
(74) *Attorney, Agent, or Firm* — Adli Law Group P.C.; Chen Huang

(57) ABSTRACT

A planting system includes a pot having a bottom floor with at least one drainage opening, a spray ring implanted in the planting medium in an upper portion of the pot and configured to inject pressurized water downwardly into the planting medium, and a grid disposed below the planting medium. The grid includes a plate spaced above the bottom floor of the pot. The plate includes apertures configured to allow roots to pass through the plate. Slats formed on the underside of the plate define a plurality of compartments configured to prevent the roots from spiraling. The grid also allows oxygen to circulate under and around the roots.

5 Claims, 16 Drawing Sheets

(56) References Cited

U.S. PATENT DOCUMENTS

| | | | | |
|---|---|---|---|---|
| 6,505,440 B1* | 1/2003 | Lai | A01G 27/06 | 47/79 |
| 6,622,430 B1* | 9/2003 | Lai | A01G 27/005 | 47/79 |
| 6,729,070 B1* | 5/2004 | Locke | A01G 27/00 | 47/79 |
| 6,964,128 B2* | 11/2005 | Yasuda | A01G 9/02 | 47/20.1 |
| 6,986,224 B2* | 1/2006 | Gelfer | A01G 27/04 | 47/81 |
| 7,685,765 B2* | 3/2010 | Stevenson, III | A01G 9/124 | 47/47 |
| 8,474,179 B2* | 7/2013 | Jung | A01G 9/086 | 47/65.6 |
| 8,613,159 B2* | 12/2013 | Thompson | A01G 9/124 | 47/47 |
| 8,656,641 B2* | 2/2014 | Rhoads | A01G 9/042 | 47/80 |
| 9,010,021 B1* | 4/2015 | Rettger, II | A01G 27/06 | 47/66.1 |
| D741,743 S * | 10/2015 | Steier | D11/164 | |
| 9,179,608 B2* | 11/2015 | Kempf | A01G 9/10 | |
| 9,241,452 B2* | 1/2016 | Stewart, Jr. | A01G 27/04 | |
| 9,521,815 B2* | 12/2016 | Panopoulos | A01G 9/02 | |
| 2005/0102900 A1* | 5/2005 | Valiquette | A01G 7/06 | 47/79 |
| 2012/0080538 A1* | 4/2012 | Reid | A01G 27/006 | 239/276 |
| 2013/0133255 A1* | 5/2013 | Wu | A01G 9/02 | 47/66.1 |
| 2013/0174484 A1* | 7/2013 | Rhoads | A01G 9/042 | 47/80 |
| 2014/0075841 A1* | 3/2014 | Degraff | A01G 27/005 | 47/62 A |
| 2015/0195996 A1* | 7/2015 | Schall | B65D 19/18 | 47/65.5 |
| 2016/0106044 A1* | 4/2016 | Markham | A01G 9/02 | 47/79 |

* cited by examiner

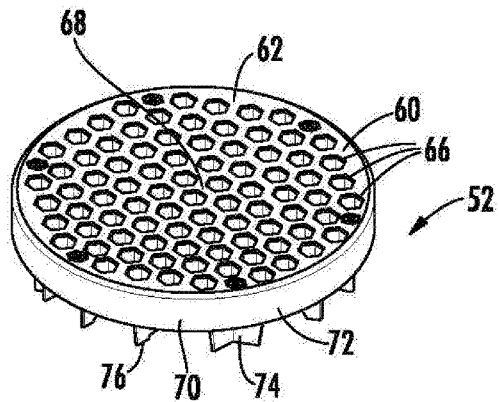
FIG. 4
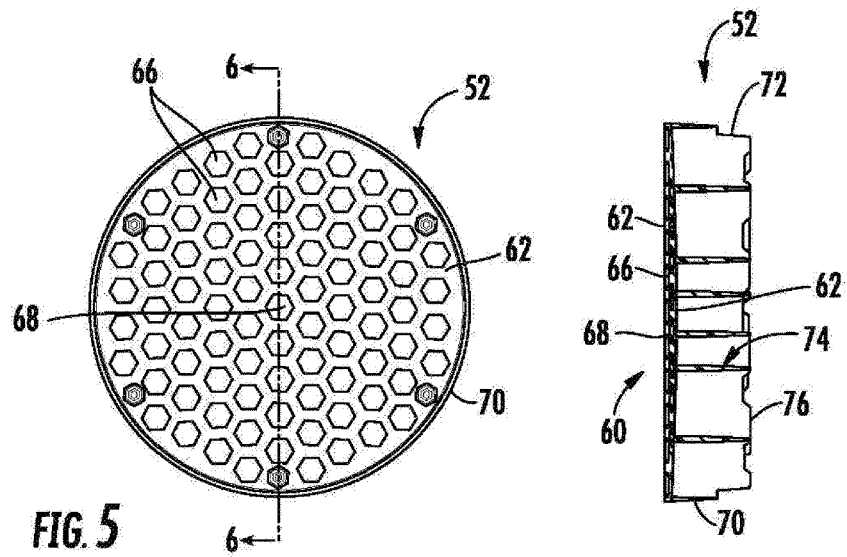
FIG. 5
FIG. 6
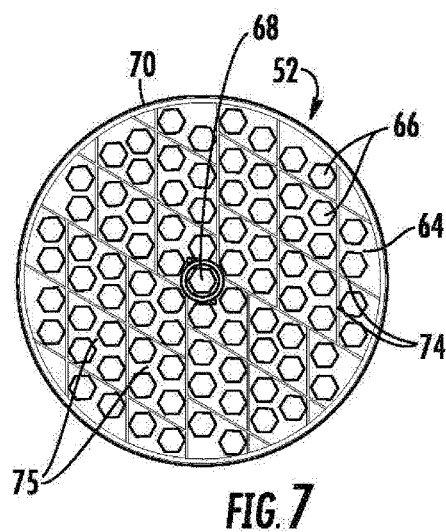
FIG. 7

PLANTING SYSTEM FOR OPTIMIZATION OF PLANT GROWTH

CROSS-REFERENCE TO RELATED PATENT APPLICATIONS

Embodiments of the present invention relate to U.S. Nonprovisional application Ser. No. 15/351,939, filed Nov. 15, 2016, entitled "PLANTING SYSTEM FOR OPTIMIZATION OF PLANT GROWTH", the contents of which are incorporated by reference herein in its entirety and which is a basis for a claim of priority.

FIELD OF THE DISCLOSURE

This disclosure relates to horticulture. More particularly, the disclosure relates to a planting system that includes features for optimizing plant growth.

BACKGROUND OF THE DISCLOSURE

It is often advantageous to grow and cultivate plants in containers rather than directly in the ground, since containers allow greater control over the planting medium, and are less likely to be exposed to parasites and weeds due to the separation of the planting medium in the container from the ground soil. Containers also allow plants to be moved indoors during inclement weather. However, traditional planters, which typically consist of a hard-sided plastic or ceramic pot having a drainage hole or holes at the bottom, have several drawbacks. For instance, the hard-sided pot may not allow an optimal level of oxygen to reach the roots because the surface area of the potting soil is being put up against a hard, non-breathable surface such as ceramic or plastic, thereby lowering the growth potential of the plants. In addition, overwatering can occur due to lack of drainage if the drainage holes do not drain quickly enough. Finally, the plants become root-bound very quickly with traditional planters because of the solid wall pot, especially if the pots are not large enough, where the roots are circled and entangled in the planting medium and the future growth of the plant is limited.

Some of the problems associated with traditional planters are overcome by fabric planters having porous sides and bottoms that allow oxygen to reach, and water to drain away from, the roots of the plants. This allows the root tips to dehydrate, forcing the root tips to branch out and become more productive. However, because such design increases the transpiration of the planting medium, water tends to evaporate from the airy, porous fabric quicker which heightens plant metabolism, causing plants to drink more water. Thus, the plants being grown in fabric planters are prone to be underwatered because of their porous fabric.

Attempts have been made to combine the features of traditional and fabric planters by providing ceramic or plastic pots with fabric liners. However, the drainage and oxygenation in most of these hybrid systems is still inadequate because ultimately planting medium is pressed up against the hard surface of the pot without a method of providing more oxygen to the root zone, thus a new design for the pot is required to overcome this shortcoming. Furthermore, the roots of the plants eventually grow through the fabric liners and may spiral, twist, kink, or become strangled in the bottom of the pot. Combined with water tabling, where plant's roots mass sit in water that has tabled upwards because of inadequate drainage, this can choke the plant when so much of the root mass is under water.

Another issue associated with planting systems is irrigation. Some planters position a reservoir of water in direct contact with the planting medium, and rely on capillary action to draw the water upwardly into the medium, which is also known as wicking system. A problem with this type of a system is that the lower part of the planting medium is always wet. Since the lower roots specialize in feeding, the constant excess moisture can slow growth and cause root disease. Other planters use drip systems, in which a dripper is implanted in or suspended over the planting medium. The dripper may be in the form of a ring having a number of drip holes formed along its lower surface. However, conventional drip rings do not distribute water through the planting medium in an optimum fashion, where the surface of the planting medium is not evenly saturated leaving web and very dry zones.

The above problems are addressed by this disclosure as summarized below.

SUMMARY OF THE DISCLOSURE

A planting system (or assembly) according to the present disclosure includes a pot having a floor, and a grid disposed within the pot. The floor of the pot may function as a sump to collect and direct excess water out of the pot. In one aspect of the disclosure, the grid is a slightly concave plate that is inserted within the pot. The plate (or the grid) includes a plurality of apertures that allow water and air to pass through. In addition, the apertures may be sized and configured to allow roots of a plant in the pot to grow through. Slats extend downwardly from the plate and divide the space beneath the plate into compartments that allow the roots to commingle but prevent them from spiraling. The bottom end of each of the slats may be spaced above the floor of the pot. This creates a permanent air space that allows the compartmentalized roots to sit in an oxygen-rich, moist environment, while removing risk of overwatering.

In another aspect of the disclosure, the grid includes a peripheral side wall that lies flush against the side wall of the pot. The bottom edge of the side wall may abut a shoulder formed between a central portion and a lower portion of the side wall of the pot. Also, on the side of the wall, there can be channels milled into the side which prevents the main soil compartment from flooding by directing excess water into the sump (i.e., bottom floor and out via the irrigation tubes.

In still another aspect of the disclosure, a grid for placement in a pot having a floor includes a plate defining a plurality of apertures sized and configured to allow roots of a plant to pass through the plate, and a plurality of slats extending downwardly from the plate, the slats defining a plurality of compartments configured to prevent the roots passing through the plate from spiraling. In some embodiments, the slats intersect one another to form quadrilaterals. The plate includes a peripheral side wall and a center, and may slope slightly downwardly towards the center. The plate may slope downwardly in a continuous arc.

In yet another aspect of the disclosure, a top feed spray planting system includes a pot having a bottom floor with at least one drainage opening, a spray ring implanted in the planting medium in an upper portion of the pot and configured to inject pressurized water downwardly into the planting medium, and a grid disposed below the planting medium. The grid includes a plate spaced above the bottom floor of the pot. The plate includes apertures configured to allow water ejected from the spray ring to pass through the plate and air below the plate to pass into the planting medium. A plurality of slats formed on the underside of the plate define a plurality of compartments. The apertures may be sized and configured to allow roots to pass through the plate, and the compartments defined by the slats may be configured to prevent the roots from spiraling. The compartments may be configured as quadrilaterals. The top feed spray planting system may also include a breathable liner disposed above the drainage grid.

These and other features, aspects and advantages of the present invention will become better understood with reference to the following drawings, description and claims.

BRIEF DESCRIPTION OF THE DRAWINGS

FIG. 4 is a perspective view of the drainage grid shown in FIG. 3.

FIG. 5 is a top view of the drainage grid of FIG. 4.

FIG. 6 is a sectional view taken through line 6-6 of FIG. 6.

FIG. 7 is a bottom view of the drainage grid of FIG. 5.

DETAILED DESCRIPTION OF THE PREFERRED EMBODIMENT(S) AND DISCLOSURE

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
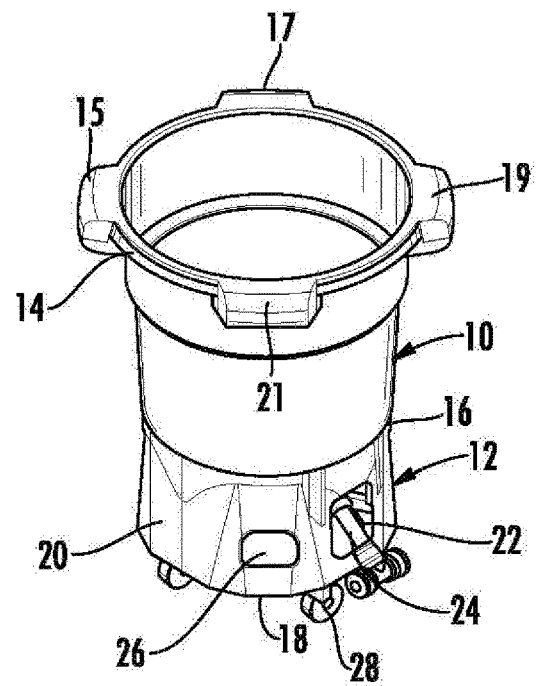
FIG. 1 is a perspective view of a pot and base of a planting system according to the present disclosure.

FIG. 1 shows a pot 10 and base 12 of a planting system according to the present disclosure. The pot 10 is generally cylindrical and has an outwardly extending rim 14 formed at its upper end. A set of radially extending gripping members 15, 17, 19, and 21 are provided along the rim 14. The base 12 is an annular member having open upper and lower ends 16, 18. A slightly tapered side wall 20 extends between the ends 16, 18. The side wall 20 includes large openings 22 that allow irrigation lines 24 to pass through, as well as foot holes 26 that a user can step into while pulling upward on gripping members 15, 17, 19, and 21 to separate the pot 10 from the base 12. The base 12 may also include casters 28 enabling the pot 10 and base 12 to be easily moved from one location to another. Both the pot 10 and base 12 may be made from molded thermoplastic material. For instance, the pot 10, base 12 and all other parts in the disclosed planting system may be made from acrylonitrile butadiene styrene (ABS) or high-density polyethylene (HDPE) or combination thereof.

Figure 2:
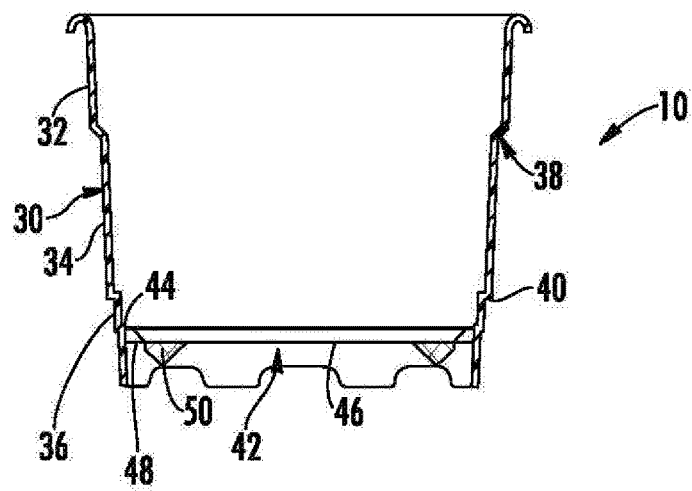
FIG. 2 is longitudinal sectional view of pot of FIG. 1, with the base removed.

As best seen in FIG. 2, the pot 10 includes a side wall 30 having an upper side wall portion 32, a central side wall portion 34, and a lower side wall portion 36. A short transition surface 38 joins the upper side wall portion 32 to the central side wall portion 34 at an angle of about 45°, and a substantially perpendicular inner shoulder 40 joins the central side wall portion 34 to the lower side wall portion 36. The outer bottom surface of shoulder 40 abuts against the upper end 16 of the base 14 when the pot 10 is inserted in the base as shown in FIG. 1. The pot 10 also includes a floor 42 having an outer peripheral portion 44 that extends substantially perpendicularly to the lower side wall portion 36, and a sunken central portion 46 that functions as a sump. The peripheral portion 44 and sunken central portion 46, both of which are substantially planar, are joined to one another to one another by a curved transition portion 48. The transition portion 48 includes a pair of drainage openings 50 configured to connect to the irrigation lines 24 shown in FIG. 1.

Figure 3:
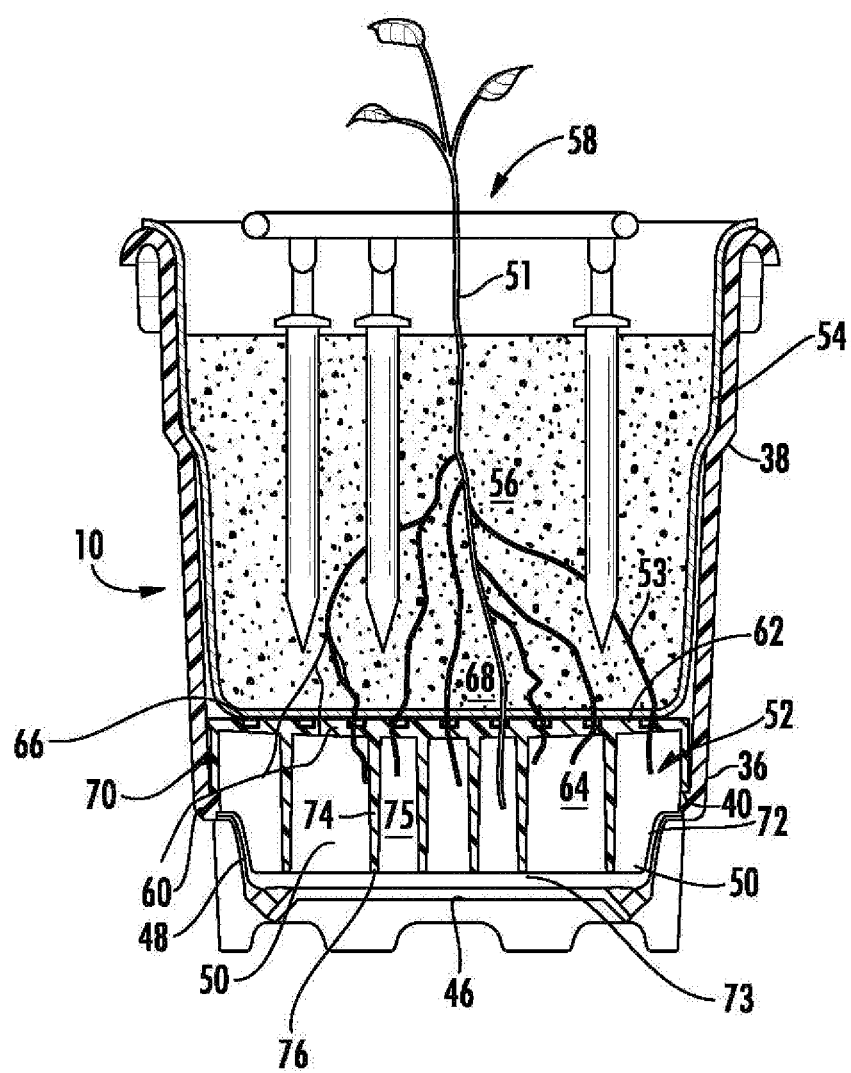
FIG. 3 is a longitudinal sectional view similar to FIG. 2, with a drainage grid, liner, planting medium and spray ring inserted in the pot.

FIG. 3 is a sectional view showing a top feed spray planting system according to the present disclosure, including the pot 10 in combination with a drainage grid 52, a liner 54 filled with planting medium 56, and a spray ring 58 configured to eject pressurized water into the planting medium 56. The liner 54, which is positioned above the drainage grid 52, may be a conventional liner formed from a breathable material that allows oxygen to reach the roots 53 of a plant 51 in the planting medium 56, and also allows water ejected from the spray ring 58 to drain out of the planting medium 56.

Additional views of the drainage grid 52 are shown in FIGS. 4-7. Drainage grid 52 includes a plate 60 having a top surface 62 and a bottom surface 64. A plurality of apertures 66 extend through the top and bottom surfaces 62, 64 of the plate 60. The apertures 66 are sized and configured to allow roots of a plant in the planting medium to extend through the plate 60. Although shown here to be hexagonal, the apertures 66 need not be restricted to any particular shape.

Plate 60 is slightly concave. Otherwise stated, the plate 60 slopes slightly downwardly toward the center 68 of the plate 60. In one embodiment of the invention wherein the pot is configured to contain approximately 105 liters of planting medium, the plate 60 has a diameter of about 22 inches and slopes downwardly in a continuous arc having a radius of curvature of about 116 inches. The concavity of the plate 60 directs water inwardly toward the center 68 of the plate 60, where it passes through apertures 66 and collects in the sump formed by the sunken central portion 46 of the floor of the pot 10, before finally draining out through drainage openings 50. The overall size of the planting system and all its components, including the pot, grid/plate and base, can be increased or decreased proportionally to create a planting system that can hold various volume of planting medium depending on a user's preference, preferably between 15 liters to 130 liters.

Plate 60 is spaced above the floor 42 of the pot 10 by a downwardly extending peripheral side wall 70 that lies flush against the central side wall portion 34 of the pot and has a bottom end 72 that abuts against the inner surface of shoulder 40 when inserted into the pot as shown in FIG. 3. The spacing between the plate 60 and the floor 42 defines a chamber 73 allowing air to circulate freely below the plate 60, providing the roots with oxygen to increase plant metabolic rates and fruit yield. The fit between the side wall 70 and central side wall portion 34 is preferably tight enough to prevent leakage around the side wall. However, in some embodiments, the fit may be somewhat loose, to allow the grid 52 to be removed and replaced.

A plurality of intersecting slats 74 are formed on the bottom surface 64 of the plate 60. Each slat 68 has a bottom end 76 that is vertically spaced from the sunken central portion 46 of the floor 42 of the pot 10. The slats 74 provide rigidity and structural support to the plate 60 and also divide the air chamber 73 beneath the plate 60 into separate compartments 75 that prevent roots that have grown through the plate 60 from spiraling. In the illustrated embodiment, the compartments 75 are diamond-shaped quadrilaterals, each of which circumscribes about four apertures 66. This allows the roots 53 to commingle, while preventing them from becoming strangled at the bottom of the pot 10.

Figure 8:
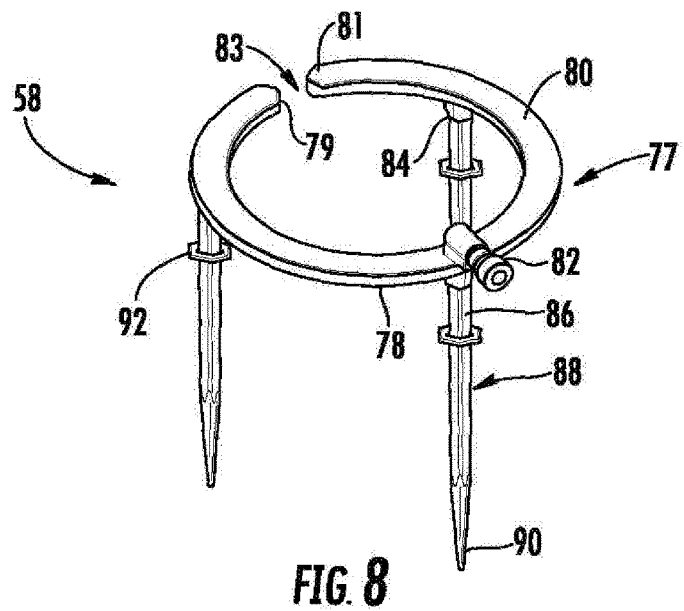
FIG. 8 is a perspective view of a spray ring according to the present disclosure.

As seen in FIG. 8, spray ring 58 is an annular body 77 having a lower portion 78, a cap 80, and circumferentially spaced apart ends 79, 81 that define a gap 83 of about 5 to 10 degrees. The lower portion 78 and cap 80 may both be formed from a rugged plastic material such as ABS, and may be secured to one another by any adhesion process such as ultrasonic welding, abs solvent based adhesive or any similar techniques. One advantage of using ultrasonic welding or abs solvent based adhesive is that it allows the spray ring 58 to withstand high water pressure and increases the spray ring's 58 durability. The cap 80 includes a fitting 82 for receiving the outlet of a hose or other conduit coupled to a source of pressurized water. The lower portion 78 includes a set of downwardly extending sockets 84 for receiving the upper ends 86 of a set of legs 88. Each leg 88 has a tapered lower end 90 allowing the legs 88 to be easily inserted into the planting medium 56, as well as an annular stop flange 92 preventing the legs 88 from being inserted beyond a predetermined depth. The annular stop flange 92 also allows the user to easily position the spray ring 58 at right depth that provides the best geometric spray pattern.

Figure 9:
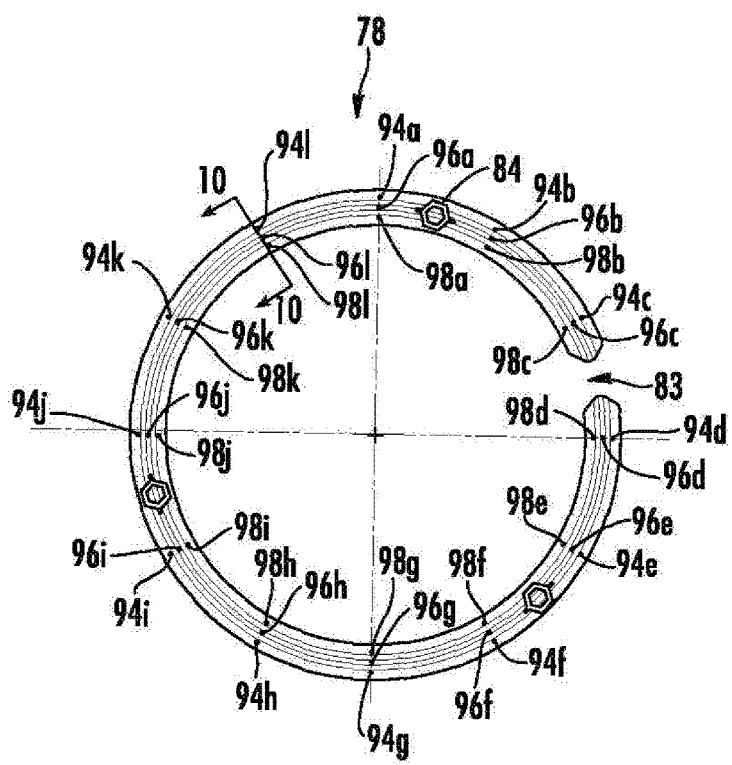
FIG. 9 is a bottom view of the spray ring of FIG. 8.

The underside of lower portion 78 includes a plurality of outlet openings, as shown in FIG. 9. More specifically, the outlet openings include a set of outer outlet openings 94a-l, a set of central outlet openings 96a-l, and a set of inner outlet openings 98a-l. The outer, central outlet openings are arranged in groups. Each group includes one outer outlet opening 94, one central outlet opening 96, and one inner outlet opening 98. The three outlet openings 94, 96, 98 in each group are radially aligned with one another, and the groups are spaced a uniform angular distance from one another. In the illustrated embodiment, there are 12 groups of outlet openings, spaced at 30-degree intervals around the lower portion 78 of the spray ring 58.

Figure 10:
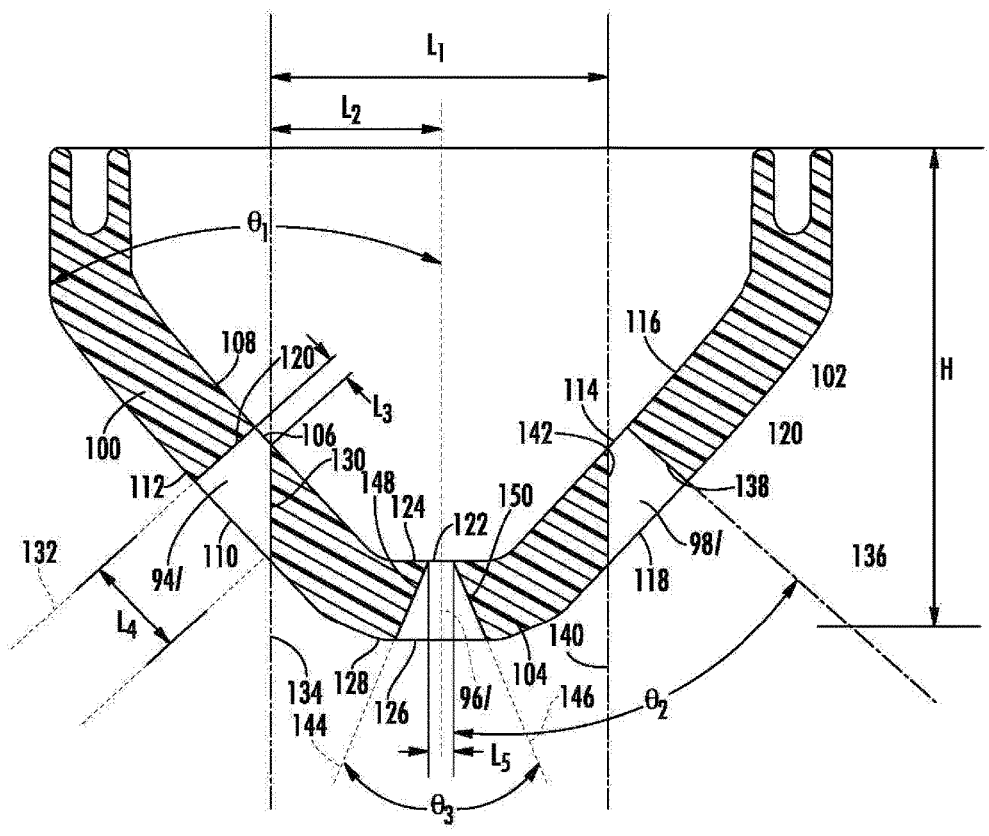
FIG. 10 is a sectional view taken through line 10-10 of FIG. 9.

As seen in FIG. 10, the lower portion 78 of the spray ring 58 is generally V-shaped in cross-section, with an outer planar wall 100 intersecting an inner planar wall 102 at a flattened vertex 104. Outer outlet opening 94l is formed in the outer planar wall 100; central outlet opening 96l is formed in the vertex 104; and inner outlet opening 98l is formed in the inner planar wall 102. The outer outlet opening 94l is configured as a conical bore having an entrance end 106 defined in the inner surface 108 of outer planar wall 100 and an exit end 110 defined in the outer surface 112 of outer planar wall 100. Similarly, the inner outlet opening 98l is configured as a conical bore having an entrance end 114 defined in the inner surface 116 of inner planar wall 102 and an exit end 118 defined in the outer surface 120 of inner planar wall 102. The central outlet opening 96l is configured as a conical bore having an entrance end 122 formed in the inner surface 124 of the vertex 104 and end exit end 126 formed in the outer surface 128 of the vertex 104. The entrance ends 106, 114, 122 of all three outlet openings 94l, 96l, and 98l are smaller in cross-section than the corresponding exit ends 110, 118, 126. Central outlet opening 96l is configured as a right conical bore, and is a truncated isosceles triangle in cross-section. Outer outlet opening 94l and inner outlet opening 98l are truncated right triangles in cross-section.

The outer outlet opening 94l has an upper side wall 129 that intersects the outer surface 112 of outer planar wall 100 at a right angle and a lower side wall 130 that intersects the outer surface 112 of outer planar wall 100 at an oblique angle. Spray is emitted from the outer outlet opening 94l in the form of a cone having an outer boundary 132 that is an extension of the upper side wall 129, and an inner boundary 134 that is an extension of the lower side wall 130. Similarly, spray is emitted from the inner outlet opening 98l in the form of a cone having an outer boundary 136 that is an extension of the upper side wall 138 of the inner outlet opening 98l, and an inner boundary 140 that is an extension of the lower side wall 142 of the inner outlet opening 98l. Spray is emitted from the central outlet opening 96l in the form of a cone having outer and inner boundaries 144, 146 that are extensions of the symmetrical side walls 148, 150, respectively, of the central outlet opening 96l.

Figure 11:
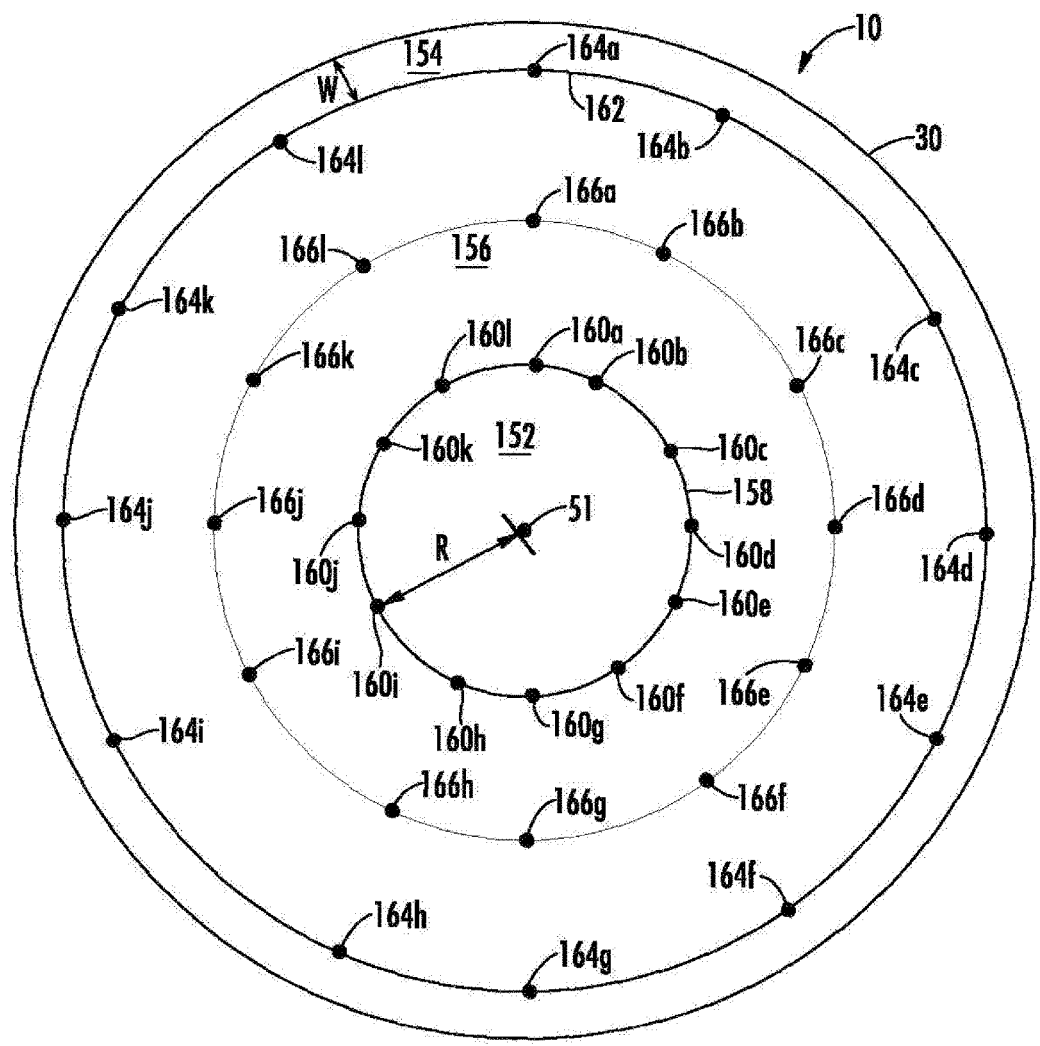
FIG. 11 is an irrigation map showing the distribution of water in a planting system according to the present disclosure.

The dimensions, positions, and geometry of the outlet openings 94a-l, 96a-l, and 98a-l, as well as the distance of the spray ring 58 at a predetermined height above the upper surface of the planting medium 56 are selected to produce an optimum distribution of water throughout the planting medium 56. The optimum distribution pattern, shown in the irrigation map of FIG. 11, comprises a set of concentric zones including a first dry zone 152 at the center of the pot 10, a second dry zone 154 adjacent the outer side wall 30 of the pot 10, and a wet zone 156 located between the two dry zones 152, 154. The first dry zone 152 is a circular area having a radius R that is selected to keep moisture away from the stem 51 of the plant, thus reducing the possibility of stem rot. In a preferred embodiment, R=4 inches, although larger or smaller dry zones maybe preferable for different types of plants. The second dry zone is an annular area having a width W selected to prevent water from running down the sides of the pot and being wasted. In the preferred embodiment, W=1 inch.

The inner boundary 158 of the wet zone 156, which also functions as the outer boundary of the first dry zone 152, is defined by a circle connecting 12 inner spray points 160a-l. The outer boundary 162 of the wet zone 156, which also functions as the inner boundary of the second dry zone 154, is defined by a circle connecting 12 outer spray points 164a-l. A set of 12 central spray points 166a-l is located midway between the inner spray points 160a-l and the outer spray points 164a-l.

To ensure that the first and second dry zones 152, 154 stay dry, and that the wet zone 156 is substantially evenly saturated throughout, the designer must select the radius and height of the spray ring 58, as well as the geometry, dimensions, and positions of the outlet openings 94a-l, 96a-l, and 98a-l such that: 1) the outer boundary 132 of the spray emitted from each of the outer outlet openings 94a-l contacts the planting medium at a corresponding one of the outer spray points 164a-l; 2) the outer boundary 136 of the spray emitted from each of the inner outlet openings 98a-l contacts the planting medium at a corresponding one of the inner spray points 160a-l; and 3) each of the central inlet openings 96a-l is located directly below a corresponding central outlet opening 96a-l.

In one example, a spray ring having the outlet geometry illustrated in FIG. 10, with an inner diameter of 14.350 inches, an outer diameter of 16.713, and the outlet dimensions listed in Table 1 was positioned 2.37 inches above the top surface of the planting medium in a pot having a capacity of up to 105 liters and an inner diameter of 25.5 inches at its top end. When pressurized water was injected into the ring at a rate of 500-1000 gallons per hour, the spray emitted from the outlets created an evenly saturated annular wet zone around the stem of a plant in the center of the pot, while leaving a first dry zone adjacent the stem and a second dry zone adjacent the outer side wall of the pot. The first dry zone was a circular area measuring about 4 inches in diameter, and the second dry zone was an annular area measuring about 1 inch in width. Rings for use with smaller or larger pots can be designed by adjusting the dimensions listed in this example proportionately to the size of the pots.

TABLE 1

Spray ring outlet dimensions for 105 L pot

| Dimension | Description | Value |
|---|---|---|
| L1 | Distance between inner and outer outlet openings | 0.555" |
| L2 | Distance between central outlet opening | 0.278" |
| L3 | Width of upper end of inner and outer outlet openings | 0.039" |
| L4 | Width of lower end of inner and outer outlet openings | 0.17" |
| L5 | Width of upper end of central outlet opening | 0.039" |
| H | Height of lower portion of annular body | 0.736" |
| Θ1 | Angle between inner/outer planar walls | 42° |
| Θ2 | Cone angle of central outlet opening | 40° |
| Θ3 | Angle between upper wall of inner/outer outlet | 48° |

Figure 12:
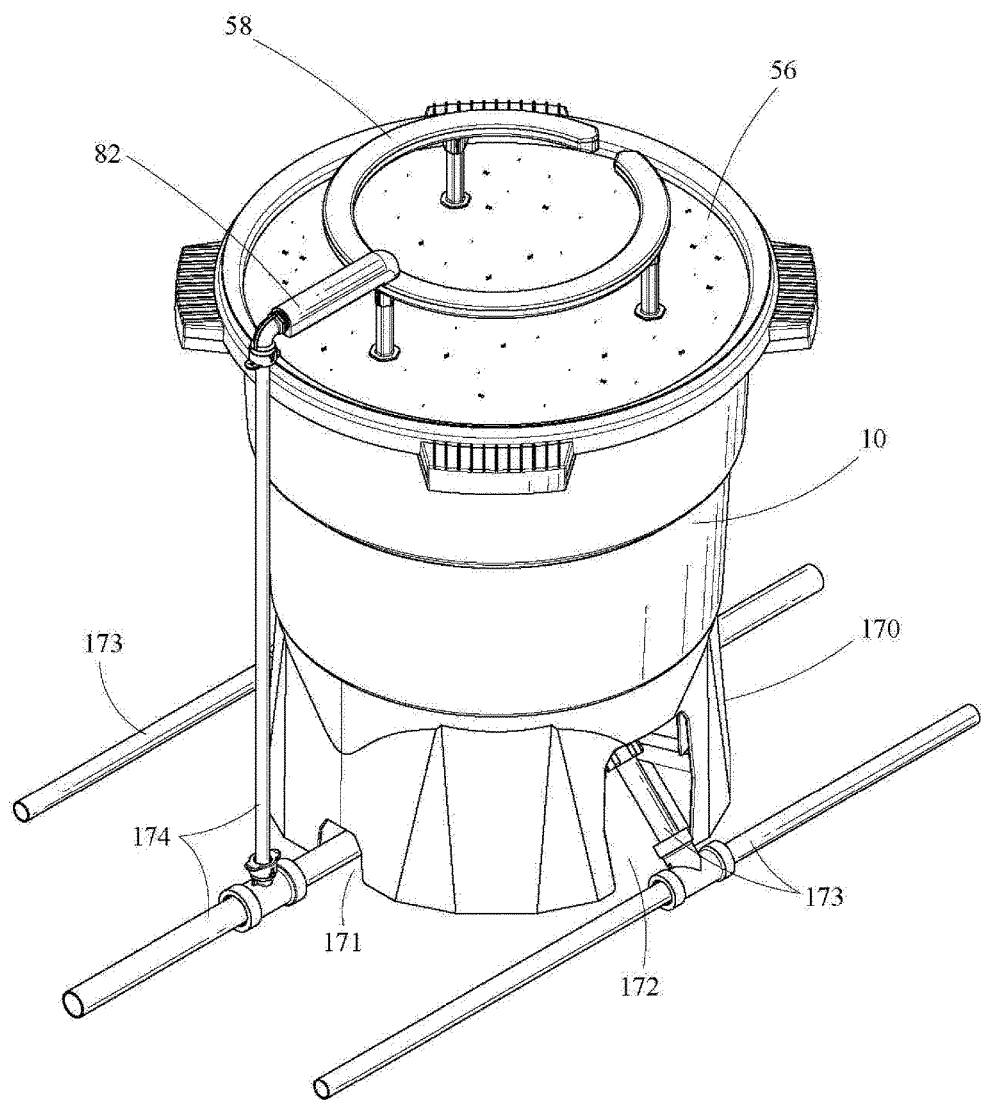
FIG. 12 is a perspective view of a planting system according to one embodiment of the present disclosure.
Figure 13:
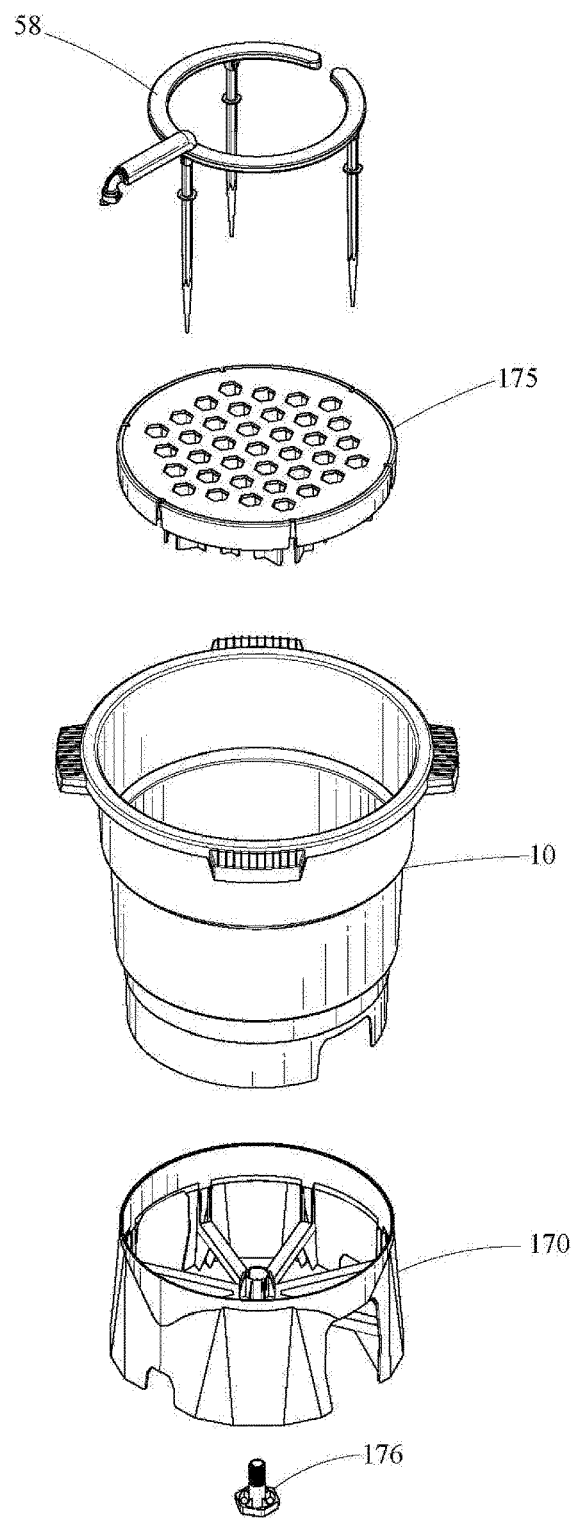
FIG. 13 is an exploded view of the planting system of FIG. 12.
Figure 14:
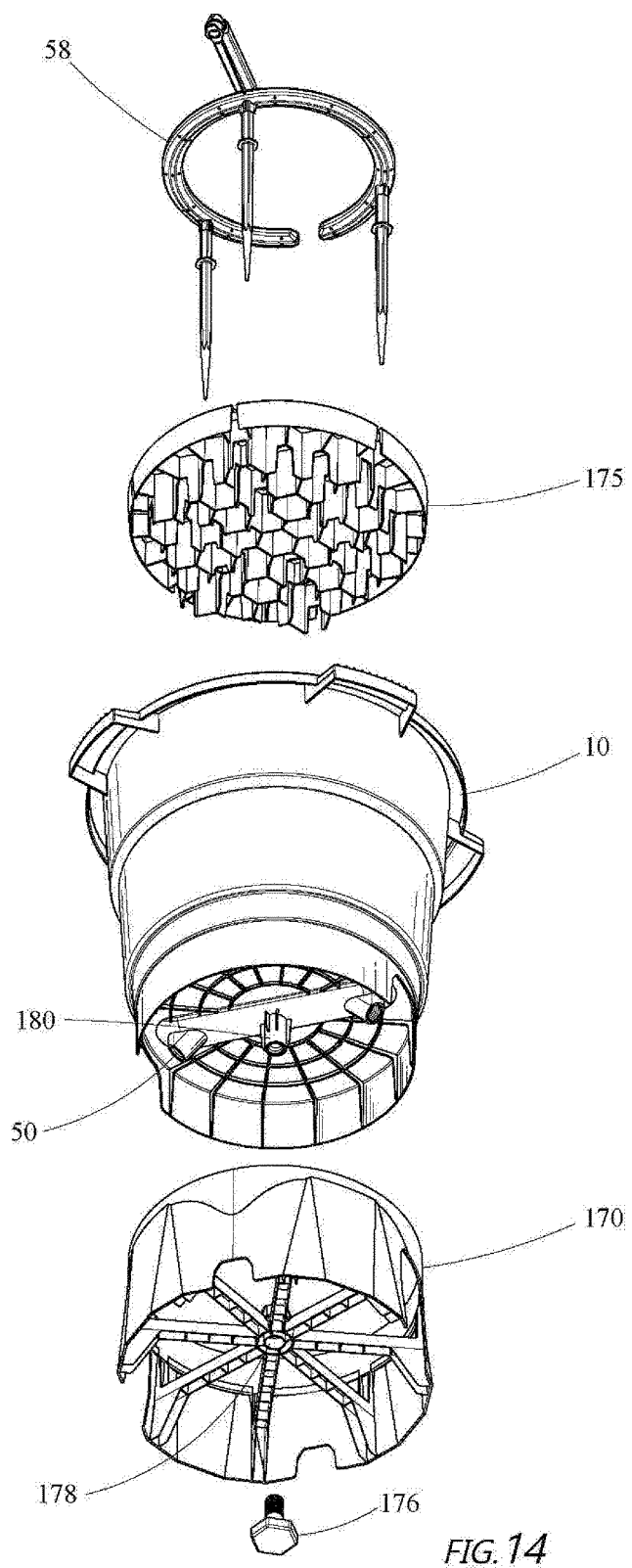
FIG. 14 is an exploded view of the planting system of FIG. 12.
Figure 15:
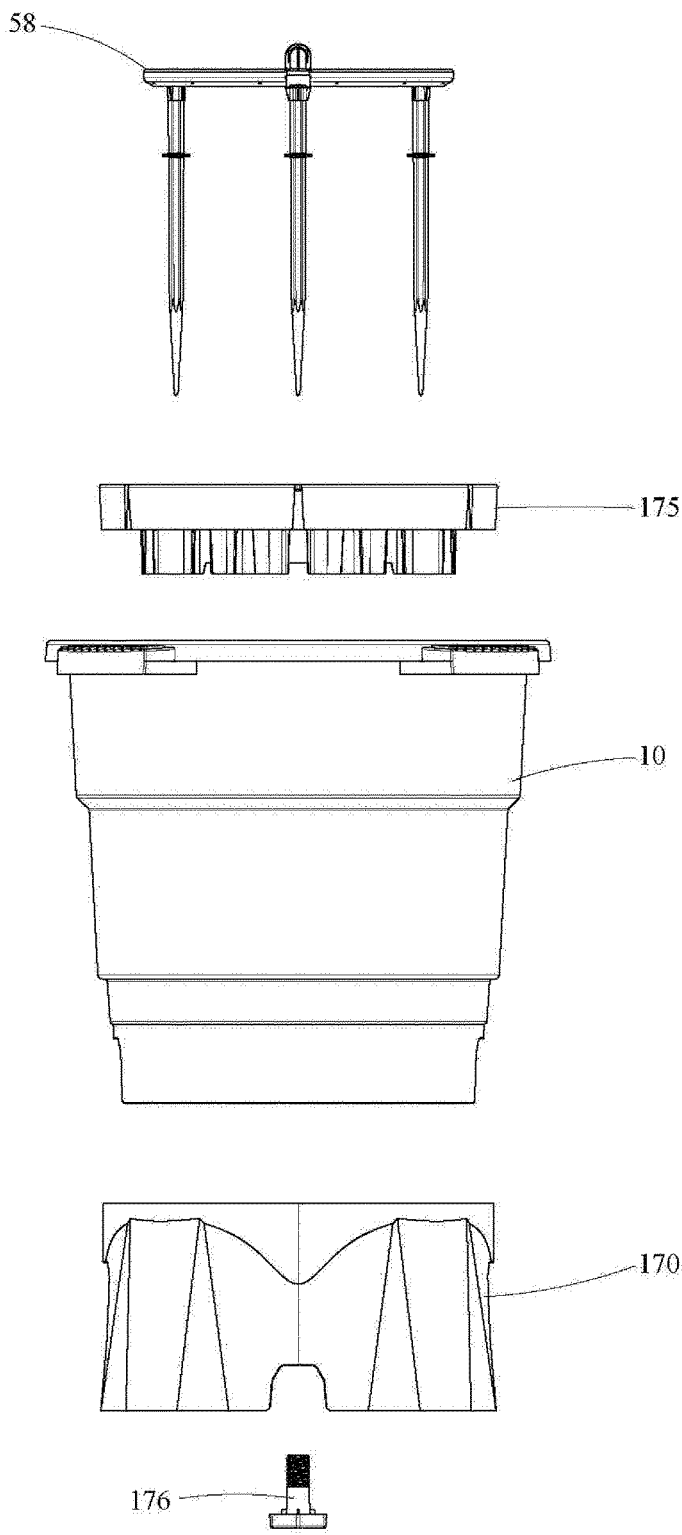
FIG. 15 is an exploded view of the planting system of FIG. 12.
Figure 16:
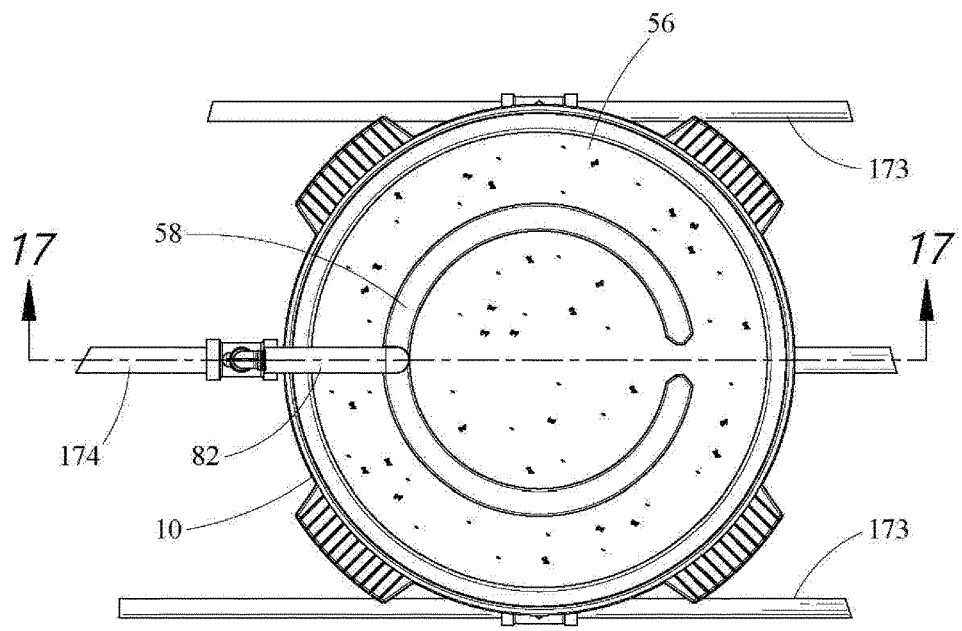
FIG. 16 is a top view of the planting system of FIG. 12.
Figure 25:
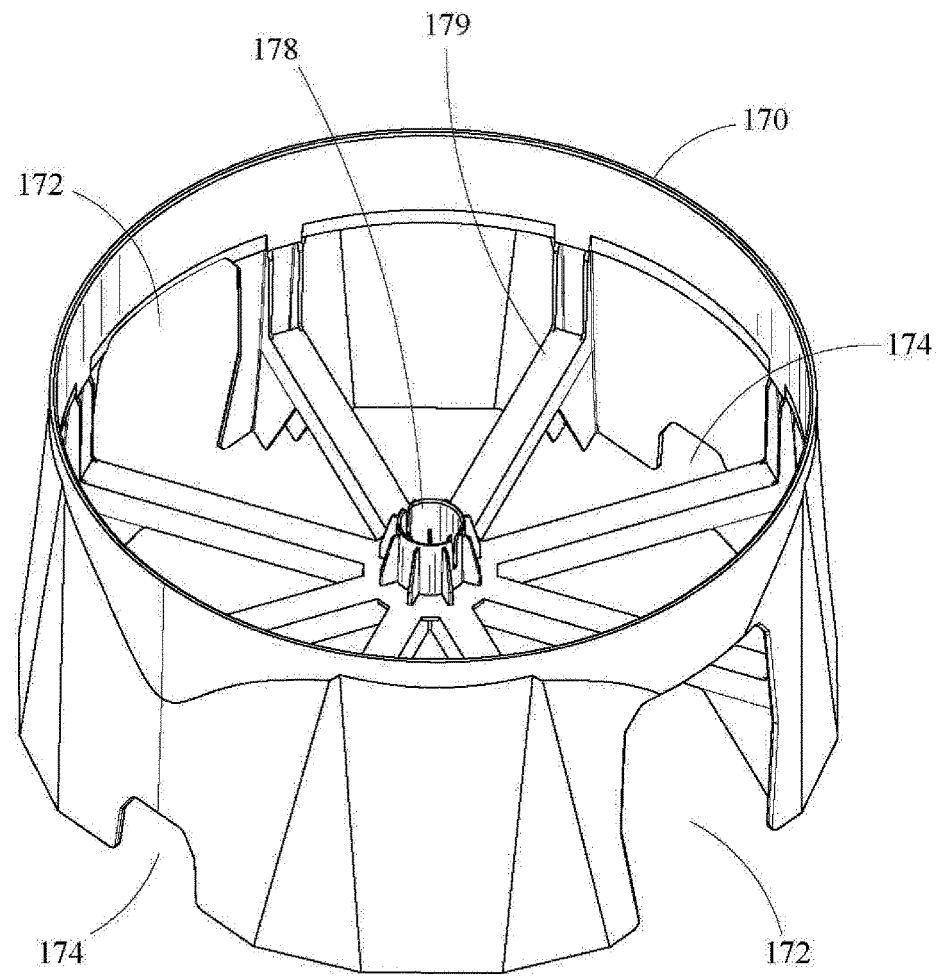
FIG. 25 is a perspective view of the base shown in FIGS. 12, 13, 14 and 15.

FIG. 12 demonstrates another embodiment of the disclosed planting system (or assembly) with slightly different configurations for base 170, grid 175 and spray ring 58. As shown by FIGS. 13 to 15 (exploded views of FIG. 12), unlike the base 12 in FIG. 1, the base 170 in this embodiment does not have any casters 28. Instead, the base has two openings 174 for water supply pipe 174 (i.e., source of pressurized water for the spray ring) and two openings 172 for water drainage pipe 173 at the bottom of the base 170. As shown by FIG. 25, the base 170 is also an annular member having open upper and lower ends. An advantage for the base 170 is that it allows multiple planting systems (or assemblies) to be connected in series through same water supply pipe 174 and water drainage pipe(s) 173. Also, this design potentially reduces the manufacturing cost for the base and is convenient for multiple pots that do not require constant moving.

Figure 17:
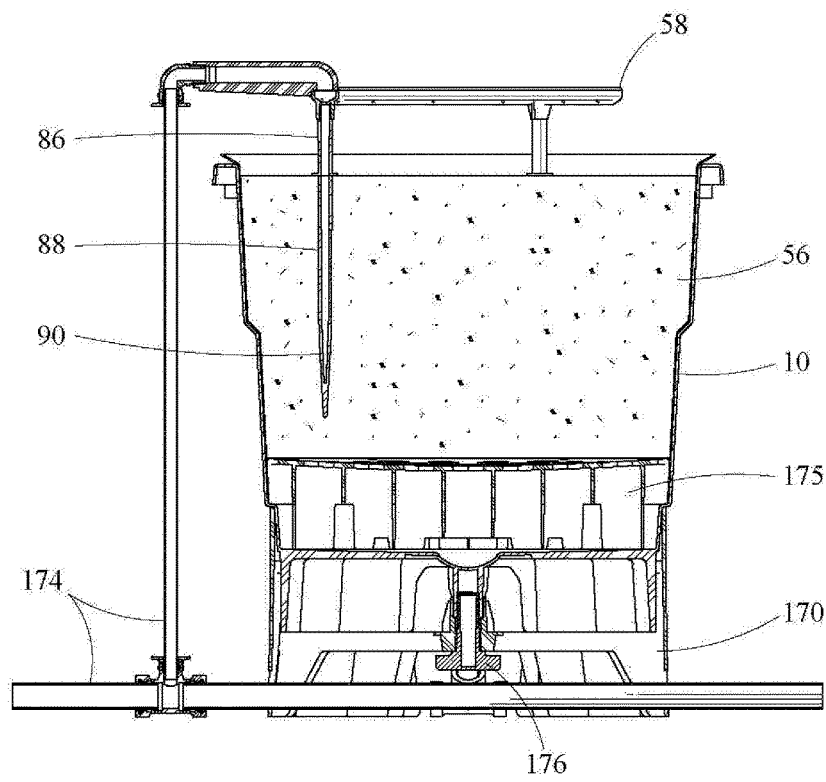
FIG. 17 is a sectional view of the planting system taken through line 17-17 of FIG. 16.
Figure 18:
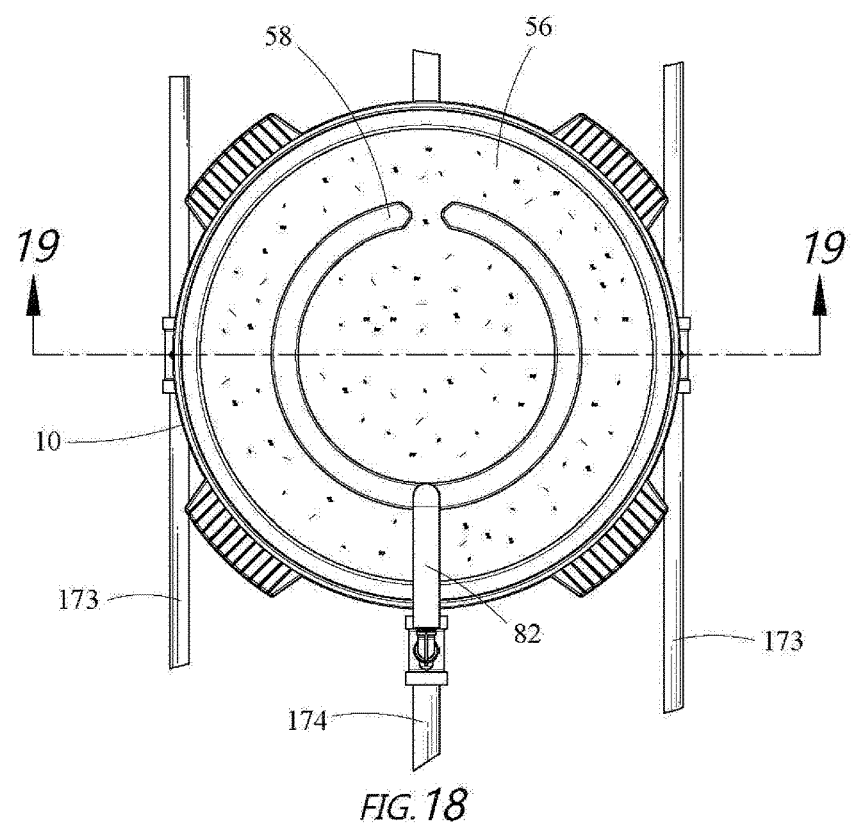
FIG. 18 is a top view of the planting system of FIG. 12.
Figure 19:
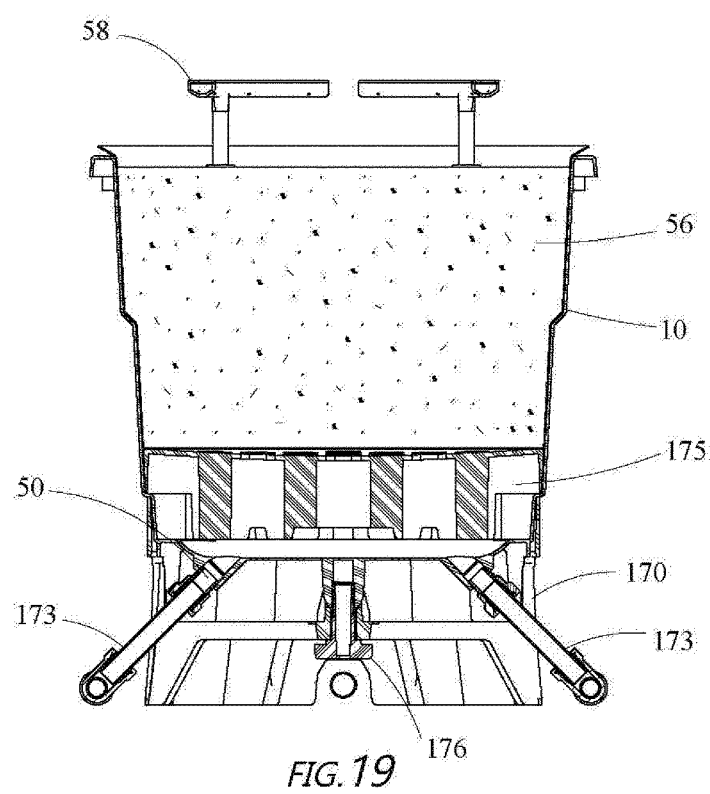
FIG. 19 is a sectional view of the planting system taken through line 19-19 of FIG. 18.

As demonstrated by FIGS. 17 and 19, the two openings 171 on the base 170 allows the water supply pipe 174 to go through and underneath the base 170, where the water supply pipe 174 is further connected to the fitting 82 of the spray ring 58, thereby providing the spray ring 58 with water source. Similarly, the two openings 172 allows the drainage openings 50 on pot 10 to connect to drainage pipes 173 on both sides of the pot 10.

To strengthen the pot 10's attachment to the base 170, the base 170 may optionally have a hole 178 in the center where the hole 178 is connected to the sidewall of the base 170 through supporting member(s) 179 as shown by FIG. 25. The supporting member 179 may be a single circular piece that attaches to the sidewall of the base 170 to the extend it can, or it can be multiple pieces as shown by FIG. 25. As shown by FIGS. 13 to 15, the hole 178 allows the base 170 to be secured to the pot 10 through a screw 176. There will also be a screw hole 180 located at the bottom and center of the pot 10 for receiving the screw 176. As previously mentioned, all the parts in the disclosed planting system may be made from acrylonitrile butadiene styrene (ABS) or high-density polyethylene (HDPE) or combination thereof. Since there may be circumstances where a user does not require drainage of water at all or only needs drainage on one side of the pot 10, the disclosed planting system may further include drainage hole screws that is capable of sealing the drainage openings 50 on pot 10 as shown by FIG. 14. Note while base 12 in FIG. 1 does not show the center hole 178 and the screw 176, same configuration can be applied to it.

Figure 22:
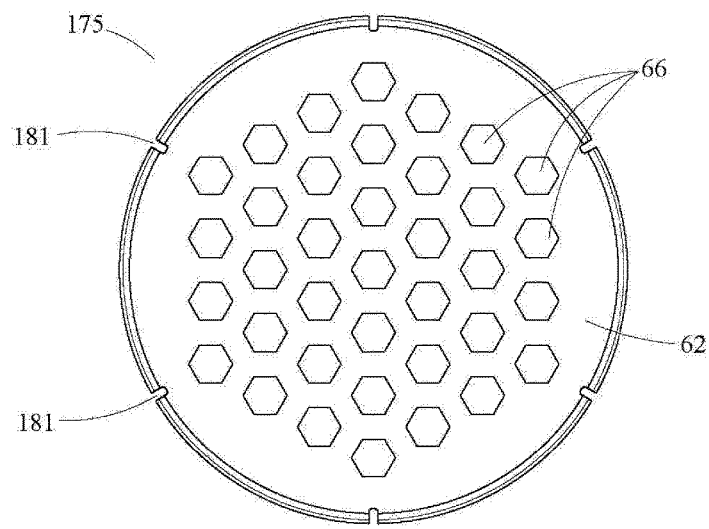
FIG. 22 is a top view of the drainage grid shown in FIGS. 13, 14 and 15.
Figure 23:
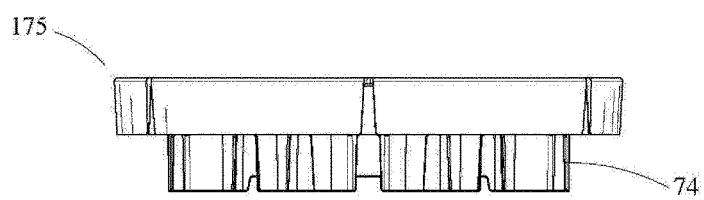
FIG. 23 is a side view of the drainage grid shown in FIGS. 13, 14 and 15.
Figure 24:
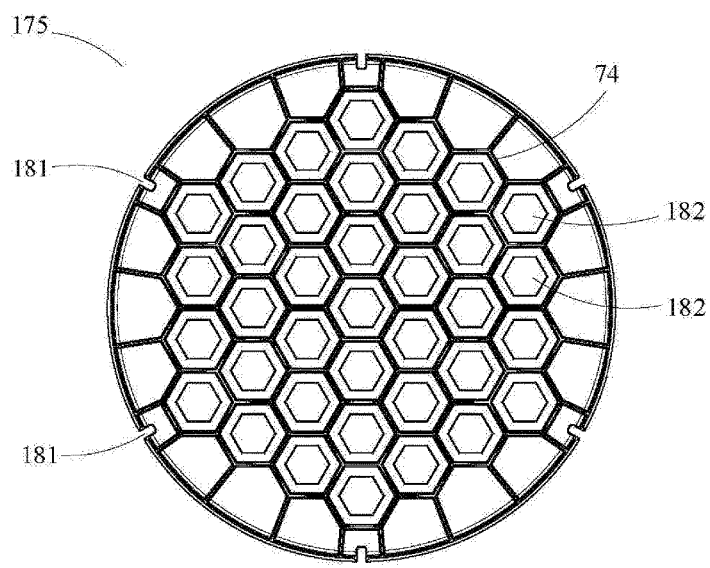
FIG. 24 is a bottom view of the drainage grid shown in FIGS. 13, 14 and 15.

FIGS. 21 to 24 are different views of grid 175 used by the embodiment in FIGS. 13 to 15. Grid 175 here is different from grid 52 in FIGS. 4 to 7 in that it has plurality of small openings 181 on its edge. With these small openings 181, the grid 175 (or the plate) does not necessary need to be slightly concaved because excess water on the sides or edge of the pot can be drained through small openings 181 (instead of forcing them towards center and drained through apertures 66 through downward slope). The small openings 181 can be configured in a way that they are spread evenly on the edge of the grid 175 (e.g., equal distance from each other). Similarly, as shown by FIGS. 23 and 24, a plurality of slats 74 extending downwardly from the grid 175 are formed on the bottom surface of the grid 175 (or plate) and are connected with each other to create a plurality of compartments 182 filled with air, and also provide rigidity and structural support to the grid 175. The plurality of compartments 182 filled with air provide roots of a plant with spaces to grow through the grid's plurality of apertures and prevent the roots from spiraling, thereby enhance the growth of the plant. Grid 175 in this embodiment is different from gird 52 in FIG. 7 in that each aperture 66 corresponds to just one compartment 182 unlike the grid 52 in FIG. 7 where multiple apertures correspond to one compartment (e.g., 75 in FIG. 7). Depending on the type of plants planted, this design may further enhance the ability of the grid 175 to prevent roots that have grown through the grid 175 from spiraling and may provide even more oxygen for the roots.

In the illustrated embodiment, while the compartments 182 in FIG. 24 are hexagonal (e.g., formed by six slats connected to each other), which corresponds to the shape of the apertures 66, the compartment 182 and the apertures 66 need not be restricted to any particular shape (i.e., it can also be circular or other polygonal shapes). Note grid 175 in FIGS. 21 to 24 can be used interchangeably with grid 52 in FIGS. 4 to 7 within pot 10. Preferably, the plurality of intersecting slats 74 should be configured to have at least twenty compartments, preferably between thirty to forty-five compartments. However, the number of compartments created can be further increased or decreased depending in part on the characteristic of a plant's roots and the shape of the compartment. For instance, for compartments in the shape of hexagon, thirty to forty, specifically 31 and 37, compartments are considered most proper.

Figure 20:
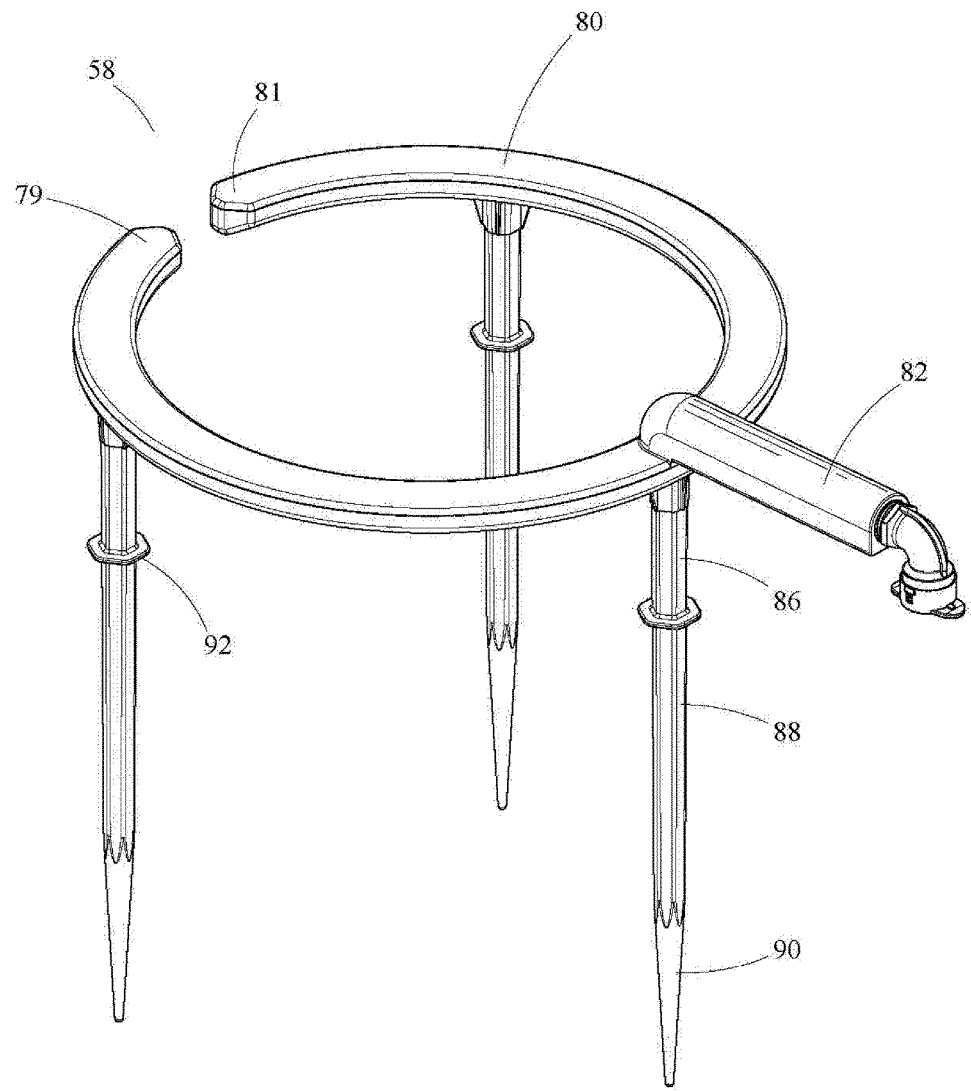
FIG. 20 is a perspective view of a spray ring according to the present disclosure.
Figure 21:
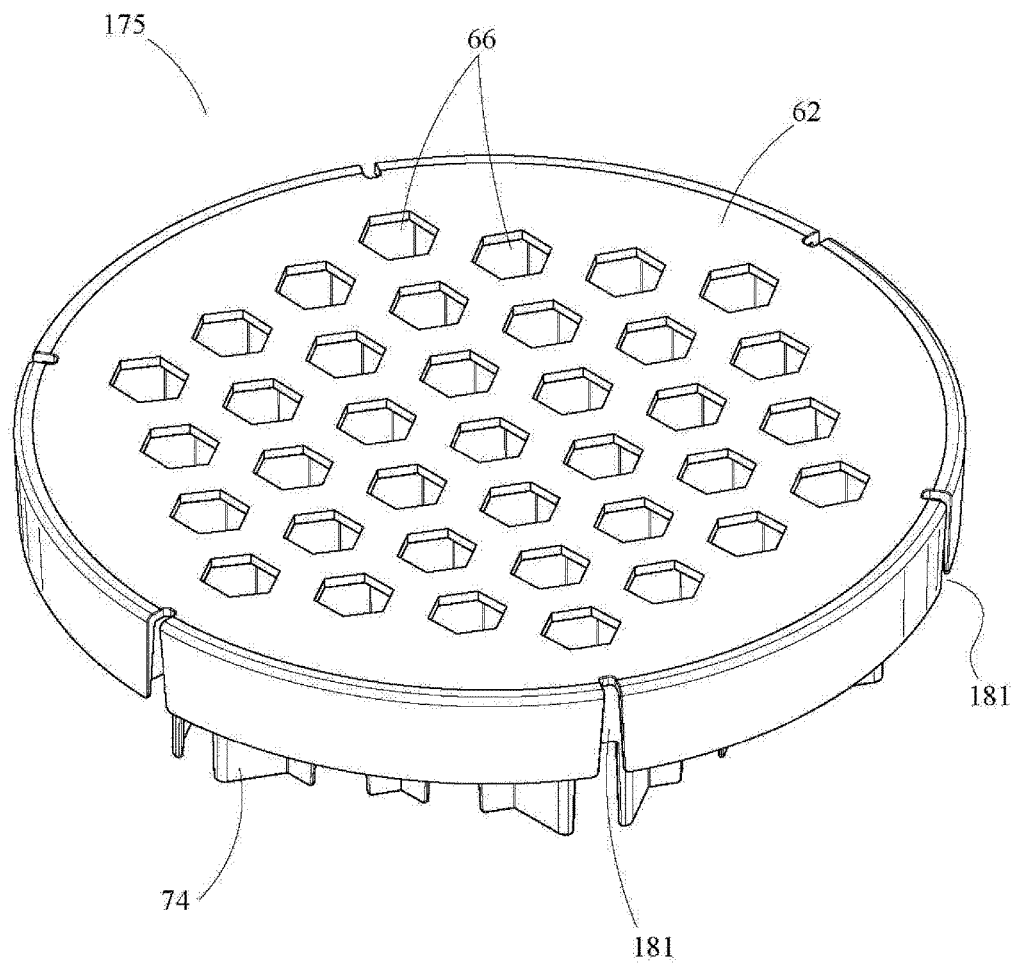
FIG. 21 is a perspective view of the drainage grid shown in FIGS. 13, 14 and 15.

FIGS. 16 to 19 are top views and sectional views for the planting system of FIG. 22. Here, the spray ring 58 is connected to the pot 10 through planting medium 56. Depending on the size of the pot, the fitting 82 for receiving the outlet of a hose or other conduit coupled to a source of pressurized water can be extended to the side of the pot as shown by the figures. FIG. 20 provides a more detailed view for the spray ring 58 with extended fitting 82, which is slightly different from the one shown by FIG. 8. However, they can be used interchangeable by the disclosed planting system depending on the user's preference.

In yet another embodiment of the present disclosure, a method of enhancing a plant's growth using the planting system (or assembly) shown by FIGS. 12 to 25 is disclosed. The method comprises: 1) preparing a planting system or assembly that has a pot having a floor with at least one drainage hole on the floor, and preferably two drainage holes which prevents the pot from flooding if one hole becomes blocked (e.g., by root tissue or planting medium etc.); a grid inserted within the pot at bottom near the floor, where the grid has a plurality of apertures, and a plurality of slats extending downwardly from the grid which connected with each other to create a plurality of compartments filled with air (where the plurality of compartments filled with air are intended to provide roots of a plant with spaces to grow through the grid's plurality of apertures and prevent the roots from spiraling) and a base detachable to the pot and provides support to the pot; 2) placing a planting medium (e.g., soil) into the pot and optionally a liner between the planting medium and the pot so the space above the grid is fully or partially filled with the planting medium; 3) planting a plant or plants into the planting medium (as depicted by FIGS. 3, 17 and 19). Using the disclosed planting system, the roots of the plant will grow through the grids into the plurality of compartments, where they can receive more air than conventional planting system, thereby enhancing the plant's growth.

The method may further comprise the step of placing a spray ring in the planting medium (e.g., by inserting legs of the spray ring into the soil) that can provide nearly 360-degree watering around the plant (as the one shown by FIGS. 8 to 11 or FIG. 20), where the spray may receive water from a water supply that runs beneath and pass through the base of the planting system. Multiple planting systems can also be used and connected in series at the same time through the same water supply pipe and drainage pipe(s).

As described above, the grid has a plurality of small openings on its edge to allow excess water from planting medium to pass through the grid from the edge (if they are closer to the edge) and into the floor of the pot, where the collected excess water is configured to be drained through the drainage hole(s). Similarly, as shown by FIGS. 23 and 24, a plurality of slats extending downwardly from the grid are formed on the bottom surface of the grid (or plate) and are connected with each other to create a plurality of compartments filled with air, and also provide rigidity and structural support to the grid. The plurality of compartments filled with air provide roots of a plant with spaces to grow through the grid's plurality of apertures and prevent the roots from spiraling, thereby enhance the growth of the plant. Each aperture of the grid is configured to correspond to just one compartment. The compartments may be hexagonal (e.g., formed by six slats connected to each other) which corresponds to the shape of the apertures, but it may also be in other shapes such as circular or other polygonal shapes. Preferably, the shape of each compartment (horizontal shape) is the same as the shape of the aperture.

It should also be noted that when the term "a", "an", etc. is used, it is to be interpreted as "at least one" throughout the application, drawings, and claims.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A planting system comprising:
   a pot having a floor with two drainage holes on the floor and a screw hole at the bottom of the pot, where the floor serves as a sump to collect and direct excess water out of the pot through the two drainage holes;
   a grid inserted within the pot, wherein the grid has:
      a plurality of openings on its edges;
      a plurality of apertures that are configured to allow roots of a plant to grow or pass through the grid;
      a plurality of slats extending downwardly from the grid where the plurality of slats are connected to each other to form a plurality of compartments; and
      wherein each of the plurality of compartments corresponds to one of the plurality of apertures;
   a base that is secured to the pot by screwing a screw through the center of the base and onto the screw hole of the pot, wherein the base has two small openings for a water supply pipe to pass through the base and at least one large opening for at least one of the two drainage holes on the pot to be connected to a drainage pipe; and
   a spray ring that is connected to the pot through a planting medium and receives water from the water supply pipe.

2. The planting system according to claim 1, wherein the planting medium is contained within a breathable liner disposed inside the pot; and the grid is located below the liner.

3. The planting system according to claim 1, wherein the plurality of apertures and the plurality of compartments are both hexagonal.

4. The planting system according to claim 1, wherein the spray ring is secured to the planting medium through a plurality of legs and provides watering for a plant planted in the planting medium.

5. The planting system according to claim 1, wherein the spray ring is circular with a small opening, and has three legs.

\* \* \* \* \*